United States Patent
Bilenko

(10) Patent No.: US 6,936,234 B2
(45) Date of Patent: Aug. 30, 2005

(54) METHOD FOR PRODUCING ARTIFICIAL POWDER GRAPHITE

(76) Inventor: Leonid Dmitrievich Bilenko, Zaporozhskaya, 2-284, Zaporpzhie, 69002 (UA)

(*) Notice: Subject to any disclaimer, the term of this patent is extended or adjusted under 35 U.S.C. 154(b) by 424 days.

(21) Appl. No.: 10/181,673

(22) PCT Filed: Jan. 15, 2001

(86) PCT No.: PCT/UA01/00002
§ 371 (c)(1), (2), (4) Date: Jul. 15, 2002

(87) PCT Pub. No.: WO01/53200
PCT Pub. Date: Jul. 26, 2001

(65) Prior Publication Data
US 2003/0001298 A1 Jan. 2, 2003

(30) Foreign Application Priority Data
Jan. 17, 2000 (UA) ................................ 20000010248

(51) Int. Cl.⁷ ............................................. C01B 31/04
(52) U.S. Cl. ...................................................... 423/448
(58) Field of Search ....................................... 423/448

(56) References Cited

PUBLICATIONS

Goma et al., 'Microtexture and Structure of High temperature Massive Pyrocarbons Prepared on Graphite Substrates' CARBON vol. 23 #1, pp. 85–90, 1985 no month.*

* cited by examiner

*Primary Examiner*—Stuart Hendrickson
(74) *Attorney, Agent, or Firm*—Janet Sleath

(57) ABSTRACT

The invention relates to a method for obtaining artificial graphite powder for electrical engineering, manufacturing synthetic diamonds and in other fields of technology with especially high requirements for graphite purity. The novelty of the inventive method is the use of pyrolytic carbon material obtained by methane pyrolysis at a temperature of 2100–2400° C. Pyrolytic carbon obtained as a waste product of pyrolytic anisotropic material can be used as a carbon material. The method includes grinding carbon material and its graphitizing at a temperature of 2600° C.–2700° C. The inventive method simplifies the process of preparing artificial graphite powder and enhances the degree of graphitization, which improves the quality of the final product.

5 Claims, No Drawings

METHOD FOR PRODUCING ARTIFICIAL POWDER GRAPHITE

FIELD OF THE INVENTION

This invention relates to the production of artificial graphite powders for electrical engineering, manufacturing synthetic diamonds and other applications that require a high degree of graphite purity.

BACKGROUND OF THE INVENTION

There is a known method of obtaining graphite powder, comprising the steps of grinding graphite material and its subsequent purification. Primary graphite formed in a blast furnace (Accepted Patent Application of Japan No. 6102528, published on Dec. 14, 1994), or graphite with a degree of purity below 95% (Accepted Patent Application of Japan No. 6102529, published on Dec. 14, 1994.) are used as graphite source material. Graphite material is ground under the action of instant unidirectional external forces either in a jet mill or in a crusher with high-speed blades. Graphite material is purified with hydrofluoric acid (Accepted Patent Application of Japan No. 6102529, published on Dec. 14, 1994), or with gaseous halogen at a high temperature (Accepted Patent Application of Japan No. 6045446, published on Jun. 15, 1994), or concentrated sulfuric acid (Accepted Patent Application of Japan No. 7014803, published on Feb. 22, 1995.).

The well-known method of obtaining graphite powder is complicated because of the hardware used. Low microhardness of graphite material requires the application of complex special devices and technologies for its grinding, and the use of highly corrosive media for graphite purification requires special chemical-proof equipment. The method of obtaining artificial graphite powder, including grinding carbon material and its graphitizing at a temperature of 2600–2700° C. (Accepted Patent Application of Japan No. 6021018, published on Mar. 23, 1994) is also known. Fresh coke is used as a source of carbon, with a hydrogen content of no less than 2%, or mixed with a carbonaceous substance in mesophase, which are treated after grinding with sulfuric or nitric acid, then washed with water, alkali or an organic solvent.

Artificial graphite powder obtained by well-known method is characterized by a modest degree of graphitization, i.e., degree of approximation of its structure to the perfect graphite structure, which is the reason for obtaining graphite of insufficient quality. This is attributable to the fact that when fine-grinding the above source carbon materials, the elements of crystal structure are destroyed, i.e., amorphization occurs. Hence, the graphitizing ability of initial carbon materials is reduced, resulting in obtaining artificial graphite of modest quality, whose structure is far from perfect graphite structure. The defects in the structure of artificial graphite powder obtained by the well-known methods are also caused by residual impurities present in coke. In addition, the well-known method is complex because of hardware used, as it requires special equipment resistant to the attack of strong acids and alkalis.

OBJECT AND SUMMARY OF THE INVENTION

The object of the proposed invention is to improve the method for the production of artificial graphite powder, which ensures the enhancement of the degree of graphitization of the final product by the use of a new substance and improves its quality with simultaneous simplification of the method.

For achieving the above goal, in the well-known method of obtaining artificial graphite powder, comprising the grinding of carbon material and its graphitizing at a temperature of 2600–2700° C., the novelty, according to the invention, is that pyrolytic carbon obtained by methane pyrolysis at a temperature of 2100–2400° C. is used as carbon material.

The other novelty is that waste product of pyrolytic anisotropic material is used as carbon material.

Between the combination of essential features of the supposed invention and achievable technical result, the following cause-effect relation exists.

The application of pyrolytic carbon as carbon source material, obtained by methane pyrolysis at a temperature of 2100–2400° C., along with known features of the invention, provides the enhancement of degree of graphitization of the final product, i.e., the degree of approximation of the structure of the obtained artificial graphite powder to the perfect graphite structure. The structure of the pyrolytic carbon was formed from graphite grids located parallel to the deposition surface. Some of the parallel-located grids are combined in crystallites, thus ensuring pronounced anisotropy of pyrolytic carbon.

In the structure of pyrolytic carbon obtained by methane pyrolysis at a temperature of 2100–2400° C., large areas of three-dimensional array characteristic of graphite are noted. The more perfect structure of initial carbon material causes the enhancement of degree of graphitization of artificial graphite obtained. In this case, the structure of pyrolytic carbon is characterized by high density, absence of macro- and transition pores and the presence only of microporosities between crystallites. Structure imperfection between the layers reflects the presence of significant internal pressure, which is characteristic of high anisotropy of thermal expansion of pyrolytic carbon. This causes brittleness of pyrolytic carbon and its good grindability. When grinding pyrolytic carbon, the destruction occurs predominantly along cracks, defects and thin interpore walls, not destroying the elements of crystal structure. Thus, grinding of pyrolytic carbon obtained at the stated temperatures of 2100–2400° C., does not worsen its graphitizing ability, thereby resulting in artificial graphite powder with practically perfect crystal graphite structure. This is also conditioned by high purity of pyrolytic carbon, the initial carbon material. The absence of impurities in it is the reason for the absence of defects in the structure of graphite obtained from pyrolytic carbon, which also raises the degree of its graphitization.

Good grindability of pyrolytic carbon due to its mechanical properties (brittleness, better microhardness in comparison with graphite) allows the use of simple devices (ball mills, jaw crushers, etc.) for its grinding, while the high purity of pyrolytic carbon obviates the necessity for purification with highly corrosive agents, thus also simplifying the method. The use of pyrolytic carbon obtained by methane pyrolysis at a temperature lower than 2100° C., as a carbon material results in lowering the degree of graphitization of the artificial graphite powder obtained, due to less perfect crystal structure of such pyrolytic carbon. The increase in the temperature of methane pyrolysis ensures better crystal structure of pyrolytic carbon obtained. However, the use of pyrolytic carbon obtained at a temperature higher than 2400° C. for the production of graphite powder is inexpedient, as it causes difficulties associated with grinding of such pyrolytic carbon owing to lower microhardness and its adhering to the rubbing surfaces requires the use of special devices and processes for grinding. The subsequent graphitization at a temperature of 2600–2700° C. of ground pyrolytic carbon obtained by methane pyrolysis at the stated temperature of 2100–2400° C., owing to stresses arising in it (the compression stress is in a radial direction and the tension stress is in a tangential direction) and plastic flowability, causes change in the orientation of crystallites and provides better texturing of the material, i.e., improves crystal structure of graphitized material.

The indicated temperature of graphitization is necessary and sufficient for transforming the structure of the ground pyrolytic carbon obtained by methane pyrolysis at a temperature of 2100–2400° C., into practically perfect crystal graphite structure.

The use of a waste product of the process for the manufacture of articles from pyrolytic anisotropic material as a carbon source material also ensures better graphitization of artificial graphite powder obtained. The products from pyrolytic anisotropic material as blanks of flat shape and bodies of rotation are obtained by methane pyrolysis at 2100–2400° C. and deposition of pyrolytic carbon on a special substrate of the specified shape. Simultaneously, pyrolytic carbon is deposited on other surfaces of the reactor, in which methane is pyrolyzed. Just this pyrolytic carbon is a waste product from pyrolytic anisotropic material and at the present time it is not used anywhere.

Owing to the use of the above waste as carbon material, the simultaneous enhancement of the graphitization degree of powder artificial graphite obtained and essential reduction of its cost are provided.

DESCRIPTION OF THE PREFERRED EMBODIMENT

For realizing the proposed method, pyrolytic carbon obtained by methane pyrolysis at a temperature of 2100–2400° C. in the reactor of an electrical vacuum furnace (p 3–8 mm Hg) is used as carbon material with methane supply at a rate of 50–150 l/min, depending on the volume of the reactor and the rate of pyrolytic carbon deposition (0.2–0.25 mm/hour). Thickness of the pyrolytic carbon layer is 5 to 10 mm, density is not less than 2.0 g/cm$^3$. Then pyrolytic carbon is ground in a ball mill to 20–90 µm. The obtained powder is subjected to graphitization at a temperature of 2600–2700° C. according to the well-known technology.

Waste product from pyrolytic anisotropic material (for example, УIIB-1, УIIA-3 grades) is also used as carbon material.

Waste product is pyrolytic carbon deposited on the inner surfaces of the electrical vacuum furnace reactor during the process of obtaining products as blanks of flat shape and bodies of rotation by pyrolitic deposition of pyrolitic carbon on special substrates of specified shape by methane decomposition at 2100–2400° C.

The product obtained after graphitizing ground pyrolytic carbon is a high-purity artificial graphite powder with practically perfect graphite structure of a particle size of 10–70 µm, which can be used in manufacturing synthetic diamonds, in electrical engineering and in other technologies with especially high requirements of graphite purity.

Operation

The proposed method was tested on the operating equipment. The graphitization degree of artificial graphite powder obtained by the proposed method, has been determined by x-ray structural analysis method. The degree of graphitization, i.e., the value showing the degree of approximation of the structure of obtained artificial graphite powder to the perfect graphite structure is 0.98–0.99.

What is claimed is:

1. A method of preparing artificial graphite powder comprising:
    subjecting methane to pyrolysis at a temperature of 2100–2400° C. to provide a pyrolytic carbon material;
    grinding said pyrolytic carbon to obtain a powder; and
    subjecting said powder to graphitization at a temperature of 2600–2700° C. to obtain an artificial graphite powder having a degree of graphitization of 0.98–0.99 as determined by X-ray structural analysis.

2. The method of claim 1, wherein said pyrolytic carbon material is a waste product formed during manufacture of articles by the pyrolysis of methane at a temperature of 2100–2400° C.

3. The method of claim 1, wherein the artificial graphite powder has a particle size of 10–70 µm.

4. The method of claim 1, wherein the thickness of the pyrolytic carbon layer 5–10 mm and the density is not less than 2.0 g/cm$^3$.

5. The method of claim 1, wherein said pyrolytic carbon powder has a particle size of 20–90 µm.

* * * * *